United States Patent
Lin et al.

(10) Patent No.: US 9,785,019 B2
(45) Date of Patent: Oct. 10, 2017

(54) PIXEL STRUCUTURE AND CURVED DISPLAY

(71) Applicant: Au Optronics Corporation, Hsinchu (TW)

(72) Inventors: Hung-Che Lin, Hsinchu (TW); Yi-Jung Chen, Hsinchu (TW); Cheng-Han Tsao, New Taipei (TW); Sheng-Ju Ho, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/951,507

(22) Filed: Nov. 25, 2015

(65) Prior Publication Data

US 2017/0059946 A1    Mar. 2, 2017

(30) Foreign Application Priority Data

Aug. 24, 2015  (TW) .............................. 104127442 A

(51) Int. Cl.
  *G02F 1/1343* (2006.01)
  *G02F 1/1337* (2006.01)

(52) U.S. Cl.
  CPC .. *G02F 1/134336* (2013.01); *G02F 1/133707* (2013.01); *G02F 2001/133742* (2013.01)

(58) Field of Classification Search
  CPC ......... G02F 1/134309; G02F 1/133711; G02F 1/13439; G02F 1/136286; G02F 1/1368; G02F 1/134336; G02F 1/133707; G02F 1/1393
  See application file for complete search history.

(56) References Cited

U.S. PATENT DOCUMENTS

| | | | |
|---|---|---|---|
| 2010/0039418 A1* | 2/2010 | Chen | G09G 3/3611 345/208 |
| 2011/0242443 A1* | 10/2011 | Choi | C08G 8/12 349/38 |
| 2015/0055063 A1* | 2/2015 | Hsieh | G02F 1/133753 349/99 |
| 2015/0205172 A1* | 7/2015 | Shin | G02F 1/134363 349/143 |
| 2015/0277193 A1* | 10/2015 | Kim | G02F 1/134336 349/139 |
| 2016/0103370 A1* | 4/2016 | Kim | G02F 1/134309 349/123 |
| 2016/0266446 A1* | 9/2016 | Yang | G02F 1/134309 |

* cited by examiner

*Primary Examiner* — Fazli Erdem
(74) *Attorney, Agent, or Firm* — Jianq Chyun IP Office

(57) ABSTRACT

A pixel structure including an active device and a pixel electrode is provided. The pixel electrode is electrically connected to the active device and includes a main trunk portion and branch portions. The main trunk portion includes a first extending part and a second extending part that cross each other. The plurality of branching portions is connected to the main trunk portion, and each branching portions is separated by the main trunk portion. The branching portions include a plurality of first branching part and a plurality of second branching part. The first extending part separates the first and second branching part. An included angle of at least part of the first branching part and the second extending part is $\alpha 1$, an included angle of at least part of the second branching part and the second extending part is $\alpha 2$, and $\alpha 1$ is not equal to $\alpha 2$.

8 Claims, 16 Drawing Sheets

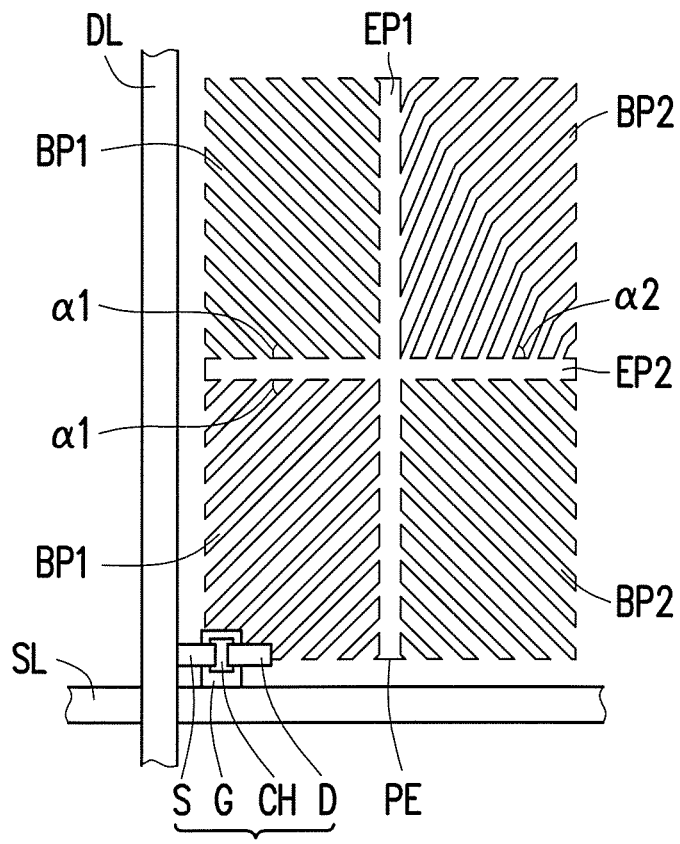
FIG. 3G
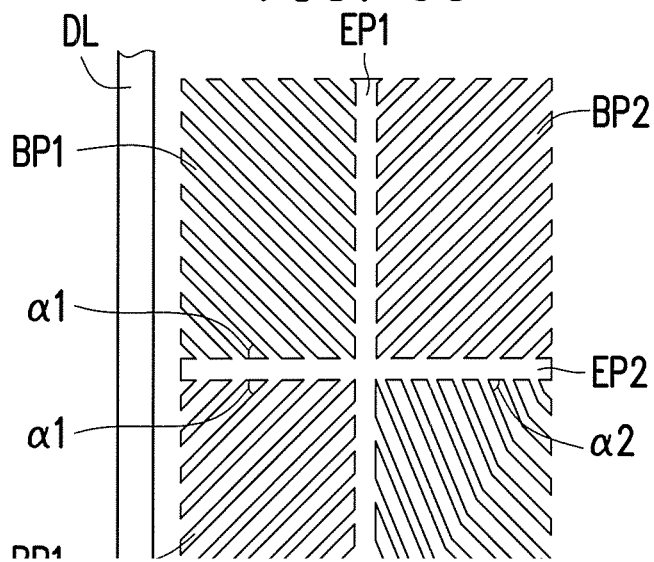

PIXEL STRUCUTURE AND CURVED DISPLAY

CROSS-REFERENCE TO RELATED APPLICATION

This application claims the priority benefit of Taiwan application serial no. 104127442, filed on Aug. 24, 2015. The entirety of the above-mentioned patent application is hereby incorporated by reference herein and made a part of this specification.

BACKGROUND

Field of the Invention

The invention is directed to a pixel structure and more particularly, to a pixel structure for a curved display.

Description of Related Art

In development of display technology, with progress of photoelectric technology and semiconductor manufacturing technology, liquid crystal displays (LCDs) advantaging in high image quality, good space utilization efficiency, low power consumption, and no irradiation, etc. become popular in the market.

An LCD includes a backlight module and an LCD panel. In view of a manufacturing technique of the LCD panel, a technique of polymer stabilized alignment (PSA) is developed, and in such technique, a polymer alignment is used in collaboration with a plurality of pixel electrodes having to a plurality of branch slits to form a multi-domain alignment. A liquid crystal material is doped with polymerizable molecules (monomers) (which is referred to as a liquid crystal mixture hereinafter) with a proper concentration. Then, a voltage is exerted to the liquid crystal mixture. When the voltage is exerted to stably arrange the liquid crystal molecules, the polymerizable molecules (monomers) can be bonded to form a polymer layer through ultraviolet irradiation, so as to complete the stabilized alignment process.

As for the current technique, either plat panels or curved panels are manufactured by the same manufacturing process. However, when a plat panel is made into a curved shape, an issue of liquid crystal alignment disorder occurs due to misalignment of upper and lower substrates, such that disclination regions are formed. To be more detailed, the disclination regions not only cause affection to brightness uniformity of the display panel, but also lead to deterioration of the liquid crystal response time. Therefore, how to solve the current problem when manufacturing the curved panels has become a subject of research.

SUMMARY

The invention provides a pixel structure which can be used to solve the current problem of liquid crystal disorder.

According to an embodiment of the invention, a pixel structure including an active device and a pixel electrode is provided. The pixel electrode is electrically connected with the active device. The pixel electrode includes a main trunk portion and a plurality of branch portions. The main trunk portion includes a first extending part and a second extending part crossing over each other. The branch portions are connected with the main trunk portion, and the branch portions are separated by the main trunk portion. The branch portions includes a plurality of first branch portions and a plurality of second branch portions. The first extending part separates the first branch portions from the second branch portions. An included angle between each of the at least part of the first branch portions and the second extending part is $\alpha 1$, an included angle between each of the at least part of the second branch portions and the second extending part is $\alpha 2$, and $\alpha 1$ is not equal to $\alpha 2$.

The invention also provides a curved display having good brightness uniformity and liquid crystal response time and capable of achieving a good display effect is provided.

According to an embodiment of the invention, a curved display including a first curved substrate, a plurality of first pixel structures, a plurality of second pixel structures and a second curved substrate is provided. The first pixel structures and the second pixel structures may be formed by the pixel structures described above. To continue, the first pixel structures are disposed on a left region of the first curved substrate, a plurality of first branch portions of each of the first pixel structures are located at the left side of the first extending part, and a plurality of second branch portions are located at the right side of the first extending part, and $\alpha 1$ is smaller than $\alpha 2$. The second pixel structures are disposed on a right region of the first curved substrate, a plurality of first branch portions of each of the second pixel structures are located at the left side of the first extending part, a plurality of second branch portions of each of the second pixel structures are located at the right side of the first extending part, and $\alpha 1$ is greater than $\alpha 2$. The second curved substrate is bounded to the first curved substrate to cover the first pixel structures and the second pixel structures. Specifically, in a viewing angle of a viewer, an outer surface of the first curved substrate is a convex curved surface, an outer surface of the second curved substrate is a concave curved surface, first extending parts in the first pixel structures are parallel to an uncurved edge of the first curved substrate, and first extending parts in the second pixel structures are parallel to an uncurved edge of the second curved substrate.

According to another embodiment of the invention, a curved display including a first curved substrate, a plurality of first pixel structures, a plurality of second pixel structures and a second curved substrate is provided. The first pixel structures and the second pixel structures may be formed by the pixel structures described above. To continue, the first pixel structures are disposed on a left region of the first curved substrate, a plurality of first branch portions of each of the first pixel structures are located at the left side of the first extending part, and a plurality of second branch portions of each of the first pixel structures are located at the right side of the first extending part, and $\alpha 1$ is greater than $\alpha 2$. The second pixel structures are disposed on a right region of the first curved substrate, a plurality of first branch portions of each of the second pixel structures are located at the left side of the first extending part, a plurality of second branch portions of each of the second pixel structures are located at the right side of the first extending part, and $\alpha 1$ is greater than $\alpha 2$. The second curved substrate is bounded to the first curved substrate to cover the first pixel structures and the second pixel structures. Specifically, in a viewing angle of a viewer, an outer surface of the first curved substrate is a concave curved surface e, and an outer surface of the second curved substrate is a convex curved surface.

To sum up, in the invention, the issues of poor brightness uniformity and the deterioration of the liquid crystal response time occurring due to the liquid crystal alignment disorder in the curved display panel can be improved by means of the pattern designs of the pixel electrodes in each pixel structure.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A to FIG. 3L are schematic diagrams illustrating examples of implementing a pixel structure according to embodiments of the invention.

DESCRIPTION OF EMBODIMENTS

Figure 1:
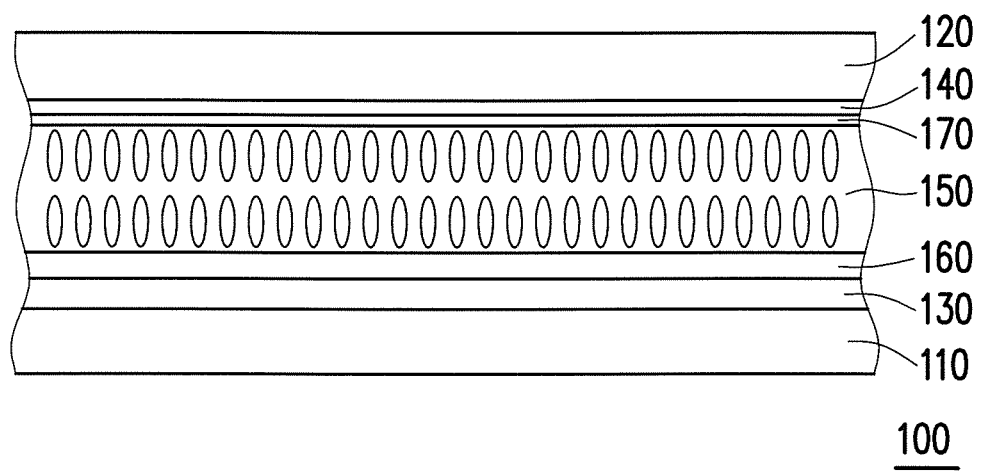
FIG. 1 is a schematic diagram illustrating a flat liquid crystal display (LCD) panel according to an embodiment of the invention.

FIG. 1 is a schematic diagram illustrating a flat liquid crystal display (LCD) panel according to an embodiment of the invention. A liquid crystal display (LCD) panel 100 of the present embodiment includes a first substrate 110, a second substrate 120, a pixel electrode layer 130, a common electrode layer 140, a liquid crystal layer 150, a first alignment layer 160 and a second alignment layer 170. The first substrate 110 and the second substrate 120 are disposed opposite to each other. The pixel electrode layer 130 is disposed on the first substrate 110, and the common electrode layer 140 is disposed on the second substrate 120. The liquid crystal layer 150 is disposed between the first substrate 110 and the second substrate 120. Additionally, the first alignment layer 160 is disposed between the liquid crystal layer 150 and the first substrate 110, and the second alignment layer 170 is disposed between the liquid crystal layer 150 and the second substrate 120.

The first alignment layer 160 and the second alignment layer 170 are, for example, polymer stabilized alignment layers capable of providing a specific anchoring force contributing to vertical alignment of liquid crystal molecules in the liquid crystal layer 150. To be detailed, a tilt angle included between the liquid crystal molecules and the first substrate 110 (or the second substrate 120) varies along with an electric field applied by the liquid crystal layer 150. When the LCD panel 100 is made into a curved shape (as illustrated in FIG. 2A), disorder of the liquid crystal alignment may occur due to the first substrate 110 being misaligned from the second substrate 120.

Figure 2A:
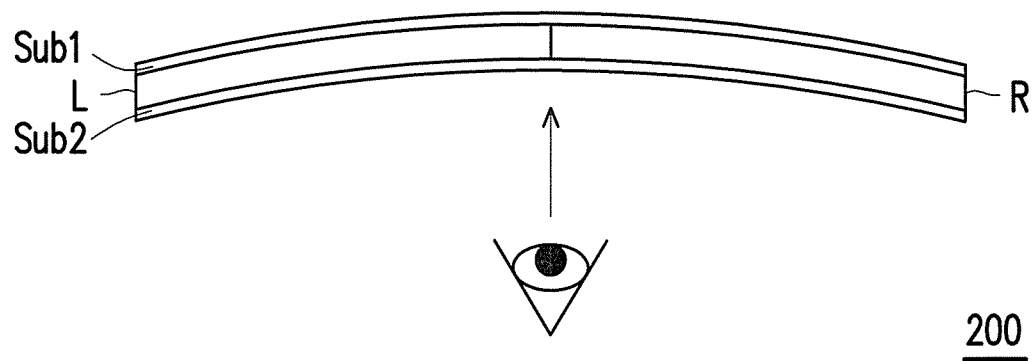
FIG. 2A is a schematic diagram illustrating a curved display according to an embodiment of the invention.
Figure 2B:
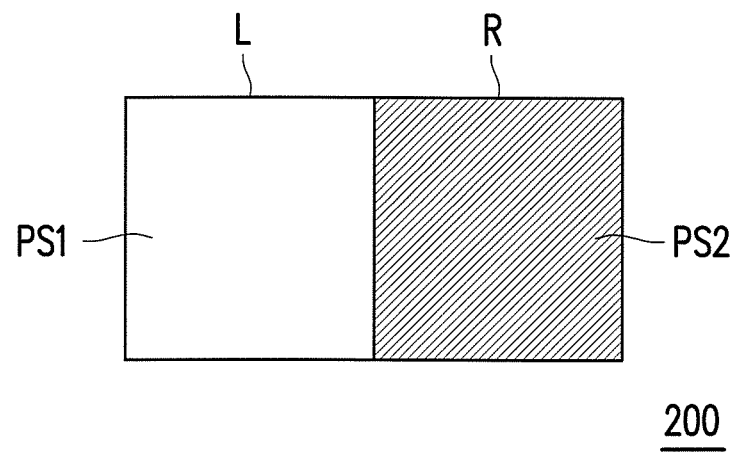
FIG. 2B is a front view of the curved display depicted in FIG. 2A in a viewing angle direction.

FIG. 2A is a schematic diagram illustrating a curved display according to an embodiment of the invention, and FIG. 2B is a front view of the curved display depicted in FIG. 2A in a viewing angle direction. Referring to FIG. 2A and FIG. 2B together, in the present embodiment, a curved display 200 includes a first curved substrate Sub1, a plurality of first pixel structures PS1, a plurality of second pixel structures PS2 and a second curved substrate Sub2. The first pixel structures PS1 are disposed on a left region L of the first curved substrate Sub1, and each of the first pixel structures PS1 is in an arbitrary combination selected from pixel structures of the embodiments illustrated in FIG. 3A to FIG. 3L, which will be described below. The second pixel structures PS2 are disposed on a right region R of the first curved substrate Sub2, and each of the second pixel structures PS2 is an arbitrary combination selected from pixel structures of the embodiments illustrated in FIG. 4A to FIG. 4L, which will be described below.

Additionally, the second curved substrate Sub2 is bonded to the first curved substrate Sub1 to cover each of the first pixel structures PS1 and each of the second pixel structures PS2. Specially, an outer surface of the first curved substrate Sub1 is a convex curved surface, and an outer surface of the second curved substrate Sub2 is a concave curved surface in a viewing angle of a viewer. Meanwhile, a first extending part (not shown) of each of the first pixel structures PS1 is parallel to an uncurved edge of the first curved substrate Sub1, and a first extending part (not shown) of each of the second pixel structures PS2 is parallel to an uncurved edge of the second curved substrate Sub2. Pixel structures of embodiments illustrated in FIG. 3A to FIG. 3L and FIG. 4A to FIG. 4L will be described in detail below.

FIG. 3A to FIG. 3L are schematic diagrams illustrating examples of implementing a pixel structure according to embodiments of the invention. Referring to FIG. 3A to FIG. 3L simultaneously, in the present embodiment, a pixel structure includes a scan line SL, a data line DL, an active device thin film transistor (TFT) and a pixel electrode PE. The scan line SL crosses the corresponding data line DL. In other words, an extension direction of the scan line SL is not parallel to an extension direction of the data line DL, and preferably, the extension direction of the scan line SL is vertical to the extension direction of the data line DL. Based on consideration with respect to conductivity, the scan line SL and the data line DL are generally made of metal materials. However, the invention is not limited thereto, and in other embodiments, the scan line SL and the data line DL may also be made of other conductive materials, such as a nitride of alloys or metal materials, an oxide of metal materials, a nitrogen oxide of metal materials or other adaptive materials or a stack layer of metal materials and other conductive materials.

The active device TFT may be a bottom gate TFT or a top gate TFT, which includes a gate G, a channel CH, a source S and a drain D. The active device TFT is electrically connected with the corresponding scan line SL and the corresponding data line DL. In addition, the active device TFT is electrically connected with the pixel electrode PE.

In the embodiments illustrated in FIG. 3A to FIG. 3L, the pixel electrode PE includes a main trunk portion MP and a plurality of branch portions BP. The main trunk portion MP includes a first extending part EP1 and a second extending part EP2 crossing over each other. Referring to FIG. 3A to FIG. 3L, the first extending part EP1 is a longitudinal extension part, and the second extending part EP2 is a lateral extension part. The branch portions BP are connected with the main trunk portion MP, and each branch portion BP is separated by the main trunk portion MP. The branch portions BP include a plurality of first branch portions BP1 and a plurality of second branch portions BP2. The first extending part EP1 separates the first branch portions BP1 from the second branch portions BP2, the second extending part EP2 separates the first branch portions BP1 into at least two parts, and separates the second branch portions BP2 into at least two parts. Accordingly, an included angle between each of at least part of the first branch portions BP1 and the second extending part EP2 is α1, an included angle between each of at least part of the second branch portions BP2 and the second extending part EP2 and α2, and α1 is not equal to α2.

Figure 3A:
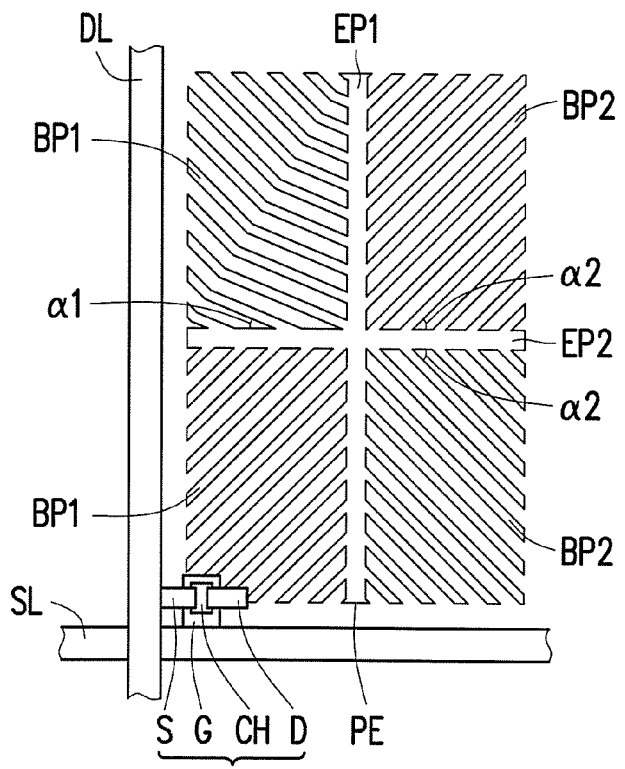

Referring to FIG. 3A first, the first branch portions BP1 are located at the left side of the first extending part EP1, the second branch portions BP2 are located at the right side of the first extending part EP1, and α1 is smaller than α2. To be detailed, part of the first branch portions BP1 include a plurality of stripe patterns extending obliquely and parallel to one another, and the rest of first branch portions BP1 includes a plurality of folded-line patterns extending obliquely and parallel to one another. Referring to FIG. 3A, the first branch portions BP1 having the stripe patterns are disposed, for example, at the lower left side of the first extending part EP1, the second branch portions BP2 having the stripe patterns are disposed, for example, at the upper right side and at the lower right side of the first extending part EP1, and the first branch portions BP1 having the folded-line patterns are disposed, for example, at the upper left side of the first extending part EP1. The included angle between each of the first branch portions BP1 having the folded-line patterns and the second extending part EP2 is α1, and α1 is smaller than 45 degrees. Additionally, the second branch portions BP2 include a plurality of stripe patterns extending obliquely and parallel to one another, and the included angle between each of the second branch portions BP2 and the second extending part EP2 is α2, and the α2 is 45 degrees.

In the present embodiment, since the included angle α1 between each of the part of the first branch portions BP1 and the second extending part EP2 is smaller than the included angle α2 between each of the second branch portions BP2 and the second extending part EP2, the pixel structure of the present embodiment may be used to fix the issue of the liquid crystal alignment disorder. Specifically, when the first substrate 110 and the second substrate 120 depicted in FIG. 1 are misaligned due to being curved, a feather-like disclination region appears near the left side or the right side of the first extending part EP1 in the pixel structure. In the present embodiment, the pattern designs of the first branch portions BP1 and the second branch portions BP2 can be utilized to achieve α1 being smaller than α2 in the pixel electrode PE. Thus, the pixel structure illustrated in FIG. 3A may be used to improve the disclination region on the left region L of the curved display 200 depicted in FIG. 2A, so as to narrow a distribution range of the feather-like region.

Figure 3B:
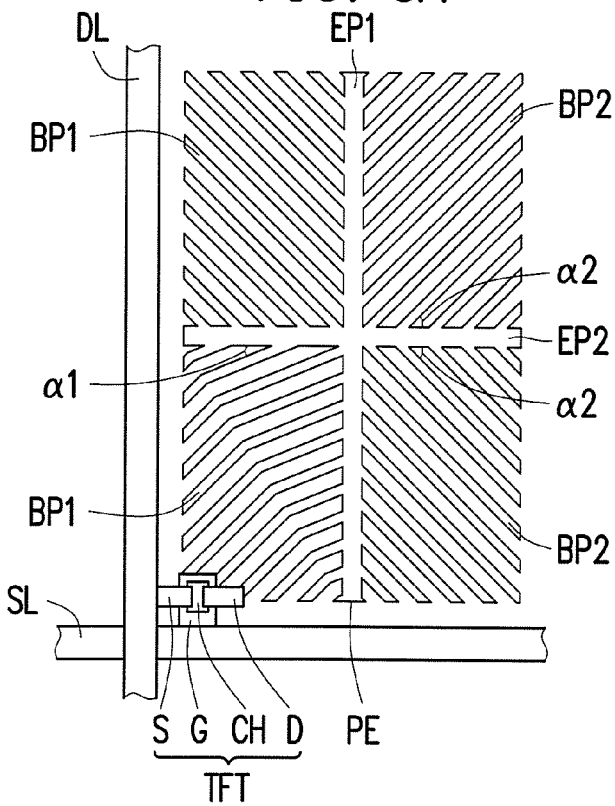

Then, referring to FIG. 3B, FIG. 3B illustrates a pixel structure similar to the pixel structure illustrated in FIG. 3A, therefore the same elements are labeled by the same reference numerals and will not be repeatedly described. The embodiments illustrated in FIG. 3B and FIG. 3A are different in the first branch portions BP1 having the stripe patterns being disposed at the at the upper left side of the first extending part EP1, and the second branch portions BP2 having the stripe patterns being disposed at the upper right side and the lower right side of the first extending part EP1 in the pixel structure illustrated in FIG. 3B. Meanwhile, the first branch portions BP1 having the folded-line patterns are disposed, for example, at the lower left side of the first extending part EP1. Likewise, in the pixel structure illustrated in FIG. 3B, since the included angle α1 (<45 degrees) between each of part of the first branch portions BP1 and the second extending part EP2 is smaller than the included angle α2 (45 degrees) between each of the second branch portions BP2 and the second extending part EP2, the pixel structure of the present embodiment may be used to improve the disclination region appearing near the left side of the first extending part EP1, so as to narrow the distribution range of the feather-like region.

Figure 3C:
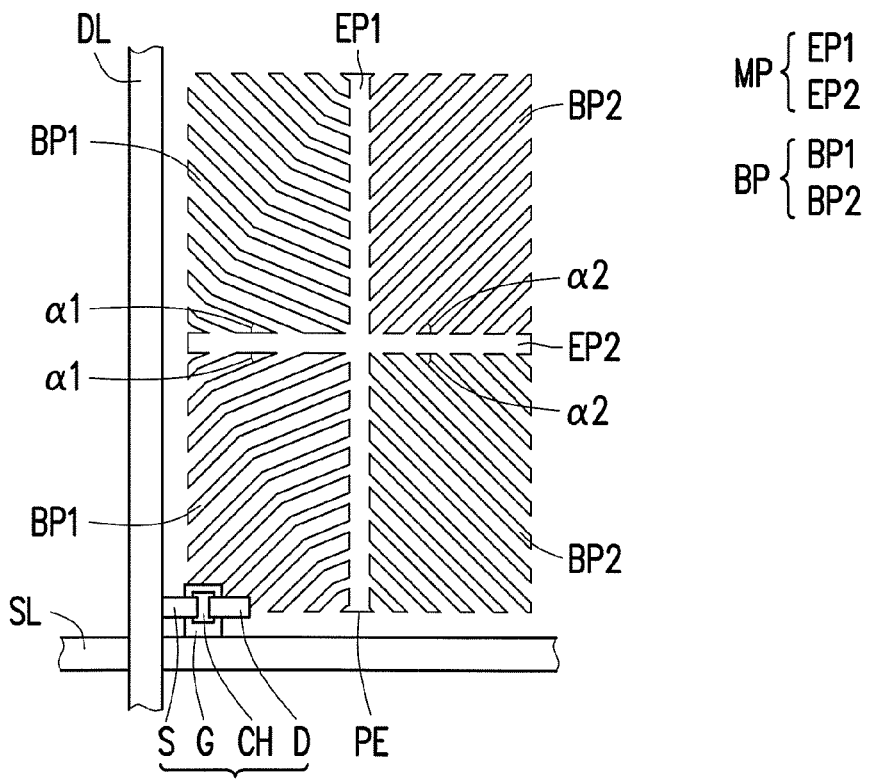

Then, referring to FIG. 3C, FIG. 3C illustrates a pixel structure similar to the pixel structure illustrated in FIG. 3A, therefore the same elements are labeled by the same reference numerals and will not be repeatedly described. The embodiments illustrated in FIG. 3C and FIG. 3A are different in the first branch portions BP1 including a plurality of folded-line patterns extending obliquely and parallel to one another in the pixel structure illustrated in FIG. 3C. In other words, the first branch portions BP1 having the folded-line patterns are disposed, for example, at the upper left side and the lower left side of the first extending part EP1, and the second branch portions BP2 having the stripe patterns are disposed, for example, at the upper right side and the lower right side of the first extending part EP1. Besides, the second branch portions BP2 include a plurality of stripe patterns extending obliquely and parallel to one another. Likewise, in the pixel structure illustrated in FIG. 3C, since the included angle α1 (<45 degrees) between each of the first branch portions BP1 and the second extending part EP2 is smaller than the included angle α2 (45 degrees) between each of the second branch portions BP2 and the second extending part EP2, the pixel structure of the present embodiment may be used to improve the disclination region appearing near the left side of the first extending part EP1, so as to narrow the distribution range of the feather-like region.

Figure 3D:
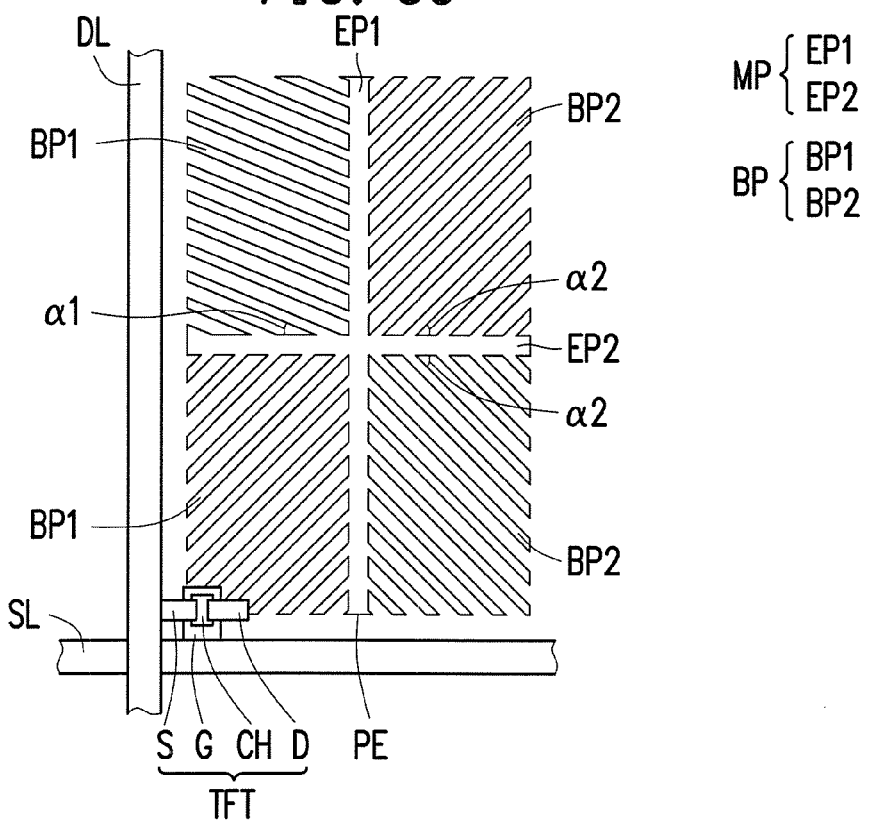

Then, referring to FIG. 3D, FIG. 3D illustrates a pixel structure similar to the pixel structure illustrated in FIG. 3A, therefore the same elements are labeled by the same reference numerals and will not be repeatedly described. The embodiments illustrated in FIG. 3D and FIG. 3A are different in the first branch portions BP1 located at the upper left side of the first extending part EP1 in FIG. 3A having the folded-line patterns, and the first branch portions BP1 located at the upper left side of the first extending part EP1 in FIG. 3D having the stripe patterns. Additionally, in FIG. 3D, the included angle α1 between each of the first branch portions BP1 located at the upper left side and the second extending part EP2 is smaller than 45 degrees. In other words, in the pixel structure illustrated in FIG. 3D, since the included angle α1 (<45 degrees) between each of the first branch portions BP1 and the second extending part EP2 is smaller than an included angle α2 (45 degrees) between each of the second branch portions BP2 and the second extending part EP, the pixel structure of the present embodiment may be used to improve the disclination region appearing near the left side of the first extending part EP1, so as to narrow the distribution range of the feather-like region.

Figure 3E:
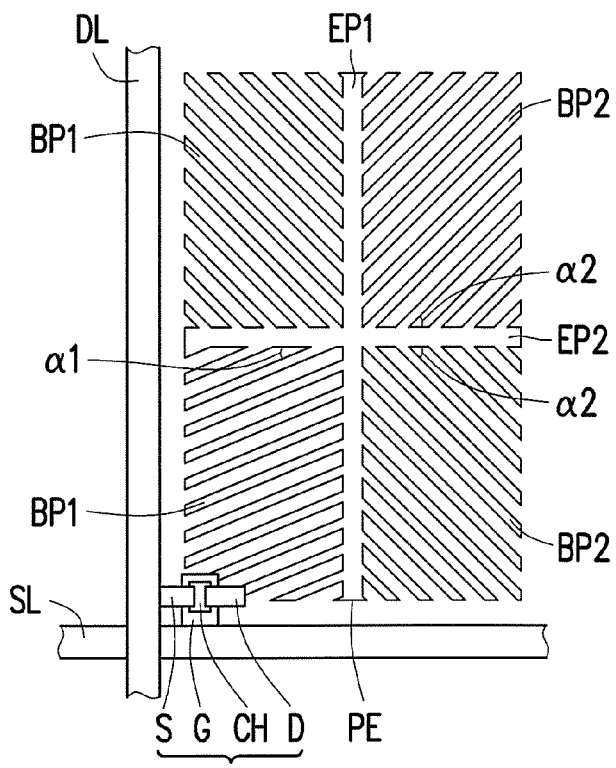

Then, referring to FIG. 3E, FIG. 3E illustrates a pixel structure similar to the pixel structure illustrated in FIG. 3B, therefore the same elements are labeled by the same reference numerals and will not be repeatedly described. The embodiments illustrated in FIG. 3E and FIG. 3B are different in the first branch portions BP1 located at the lower left side of the first extending part EP1 in the pixel structure illustrated in FIG. 3B having the folded-line patterns, and the first branch portions BP1 located at the lower left side of the first extending part EP1 in FIG. 3E having the stripe patterns. Additionally, in FIG. 3E, the included angle α1 between each of the first branch portions BP1 located at the lower left side and the second extending part EP2 is smaller than 45 degrees. In other words, in the pixel structure illustrated in FIG. 3E, since the included angle α1 between each of the first branch portions BP1 and the second extending part EP2 (<45 degrees) is smaller than the included angle α2 (45 degrees) between each of the second branch portions BP2 and the second extending part EP2, the pixel structure of the present embodiment may be used to improve the disclination region appearing near the left side of the first extending part EP1, so as to narrow the distribution range of the feather-like region.

Figure 3F:
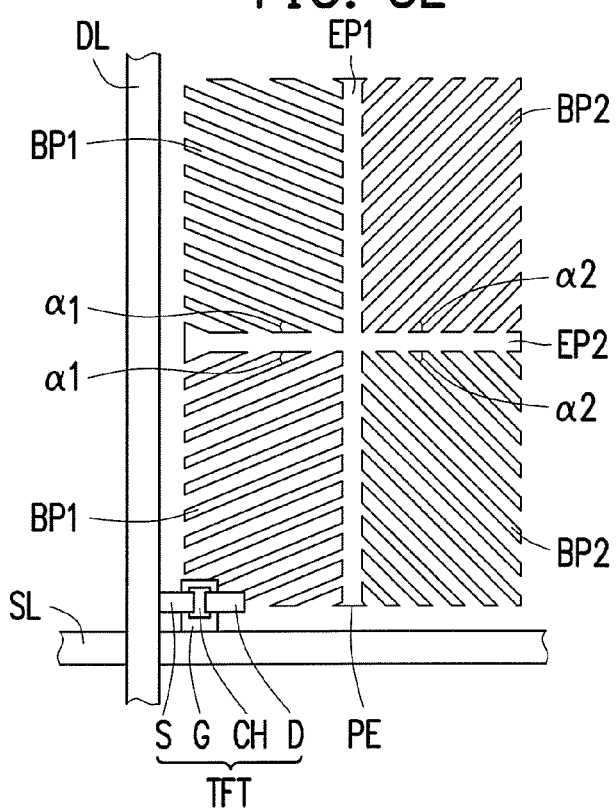

Then, referring to FIG. 3F, FIG. 3F illustrates a pixel structure similar to the pixel structure illustrated in FIG. 3C, therefore the same elements are labeled by the same reference numerals and will not be repeatedly described. The embodiments illustrated in FIG. 3F and FIG. 3C are different in each of the first branch portions BP1 located at the upper left side and the lower left side of the first extending part EP1 in FIG. 3C having the folded-line patterns, and each of the first branch portions BP1 located at the upper left side and the lower left side of the first extending part EP1 in FIG. 3F having the stripe patterns. Additionally, in FIG. 3F, the included angle α1 between each of the first branch portions BP1 located at the upper left side and the lower left side and the second extending part EP2 is smaller than 45 degrees. In other words, in the pixel structure of FIG. 3F, since the included angle α1 (<45 degrees) between each of the first branch portions BP1 and the second extending part EP2 is smaller than the included angle α2 (45 degrees) between each of the second branch portions BP2 and the second extending part EP2, the pixel structure of the present embodiment may be used to improve the disclination region appearing near the left side of the first extending part EP1, so as to narrow the distribution range of the feather-like region.

Then, referring to FIG. 3G, FIG. 3G illustrates a pixel structure similar to the pixel structure illustrated in FIG. 3F, therefore the same elements are labeled by the same reference numerals and will not be repeatedly described. The embodiments illustrated in FIG. 3G and FIG. 3F are different in the first branch portions BP1 located at the upper left side and the lower left side of the first extending part EP1 in the pixel structure illustrated in FIG. 3G having the stripe patterns, where α1 is, for example, 45 degrees. Besides, part of the second branch portions BP2 include a plurality of stripe patterns extending obliquely and parallel to one another, and the rest of the second branch portions BP2 include a plurality of folded-line patterns extending obliquely and parallel to one another. Specially, the second branch portions BP2 having the folded-line patterns are disposed at upper right side of the first extending part EP1, and the second branch portions BP2 having the stripe patterns are disposed at the lower right side of the first extending part EP1. To be more detailed, the included angle α2 between each of the second branch portions BP2 having the folded-line patterns and the second extending part EP2 is greater than 45 degrees. In other words, in the pixel structure illustrated in FIG. 3G, since the included angle α1 (45 degrees) between each of the first branch portions BP1 and the second extending part EP2 is smaller than the included angle α2 (>45 degrees) between each of the part of the second branch portions BP2 and the second extending part EP2, the pixel structure of the present embodiment may be used to improve the disclination region appearing near the left side of the first extending part EP1, so as to narrow the distribution range of the feather-like region.

Then, referring to FIG. 3H, FIG. 3H illustrates a pixel structure similar to the pixel structure illustrated in FIG. 3G, therefore the same elements are labeled by the same reference numerals and will not be repeatedly described. The embodiments illustrated in FIG. 3H and FIG. 3G are different in the second branch portions BP2 having the stripe patterns in the pixel structure illustrated in FIG. 3H being disposed at the upper right side of the first extending part EP1, and the second branch portions BP2 having the folded-line patterns being disposed, for example, at the lower right side of the first extending part EP1. Likewise, in the pixel structure illustrated in FIG. 3H, since the included angle α1 (45 degrees) between each of the first branch portions BP1 and the second extending part EP2 is smaller than the included angle α2 (>45 degrees) between each of the part of the second branch portions BP2 and the second extending part EP2, the pixel structure of the present embodiment may be used to improve the disclination region appearing near the left side of the first extending part EP1, so as to narrow the distribution range of the feather-like region.

Figure 3I:
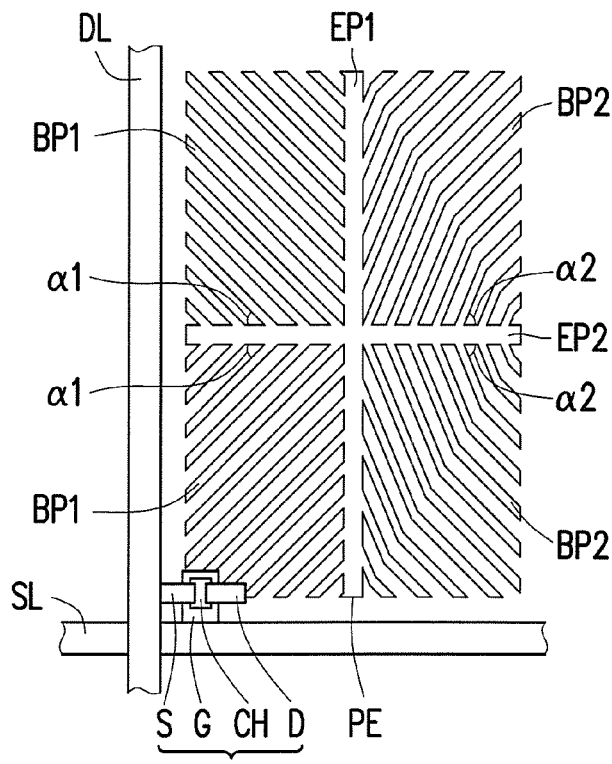

Then, referring to FIG. 3I, FIG. 3I illustrates a pixel structure similar to the pixel structure illustrated in FIG. 3G, therefore the same elements are labeled by the same reference numerals and will not be repeatedly described. The embodiments illustrated in FIG. 3I and FIG. 3G are different in the second branch portions BP2 in the pixel structure in FIG. 3I including the plurality of folded-line patterns extending obliquely and parallel to one another. In other words, the second branch portions BP2 having the folded-line patterns are disposed at the upper right side and the lower right side of the first extending part EP1. Additionally, the first branch portions BP1 include the plurality of stripe patterns extending obliquely and parallel to one another. Likewise, in the pixel structure illustrated in FIG. 3I, since the included angle α1 (45 degrees) between each of the first branch portions BP1 and the second extending part EP2 is smaller than the included angle α2 (>45 degrees) between each of the second branch portions BP2 and the second extending part EP2, the pixel structure of the present embodiment may be used to improve the disclination region appearing near the left side of the first extending part EP1, so as to narrow the distribution range of the feather-like region.

Figure 3J:
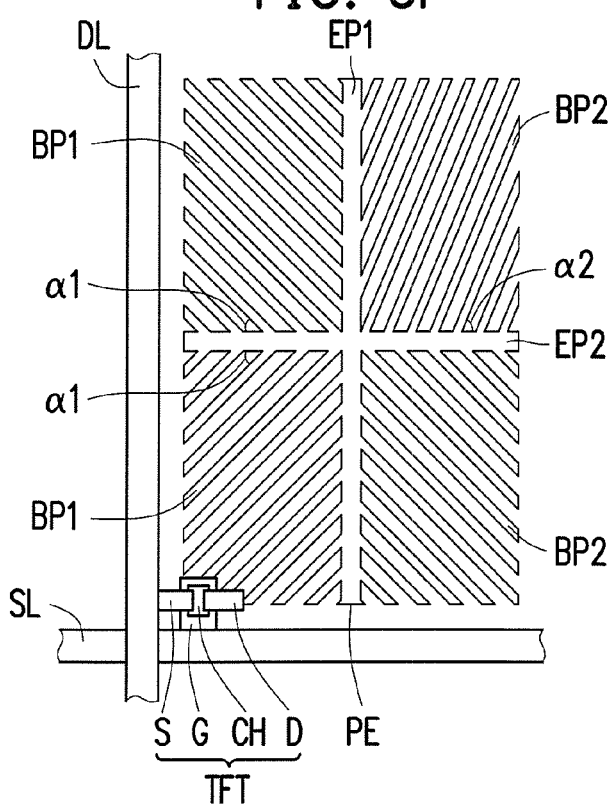

Then, referring to FIG. 3J, FIG. 3J illustrates a pixel structure similar to the pixel structure illustrated in FIG. 3G, therefore the same elements are labeled by the same reference numerals and will not be repeatedly described. The embodiments illustrated in FIG. 3J and FIG. 3G are different in the second branch portions BP2 disposed at the upper right side of the first extending part EP1 in FIG. 3G having the folded-line patterns, and the second branch portions BP2 disposed at the upper right side of the first extending part EP1 in FIG. 3J having the stripe patterns. Additionally, in FIG. 3J, the included angle α2 between each of the second branch portions BP2 disposed at the upper right side and the second extending part EP2 is greater than 45 degrees. In other words, in the pixel structure illustrated in FIG. 3J, included angle α1 (45 degrees) between each of the first branch portions BP1 and the second extending part EP2 is smaller than the included angle α2 (>45 degrees) between each of the second branch portions BP2 and the second extending part EP2, the pixel structure of the present embodiment may be used to improve the disclination region appearing near the left side of the first extending part EP1, so as to narrow the distribution range of the feather-like region.

Figure 3K:
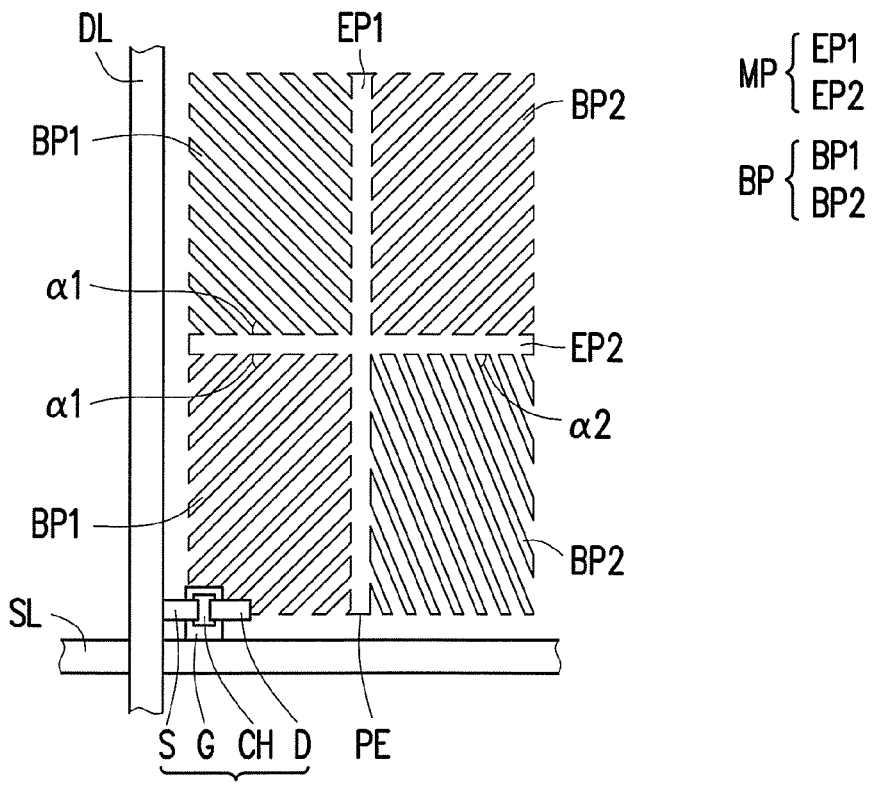

Then, referring to FIG. 3K, FIG. 3K illustrates a pixel structure similar to the pixel structure illustrated in FIG. 3H, therefore the same elements are labeled by the same reference numerals and will not be repeatedly described. The embodiments illustrated in FIG. 3K and FIG. 3H are different in the second branch portions BP2 disposed at the lower right side of the first extending part EP1 in FIG. 3H having the folded-line patterns, and the second branch portions BP2 disposed at the lower right side of the first extending part EP1 in FIG. 3K having the stripe patterns. Additionally, in FIG. 3K the included angle α2 between each of the second branch portions BP2 disposed at the lower right side and the second extending part EP2 is greater than 45 degrees. In other words, in the pixel structure illustrated in FIG. 3K, since the included angle α1 (45 degrees) between each of the first branch portions BP1 and the second extending part EP2 is smaller than the included angle α2 (>45 degrees) between each of the part of the second branch portions BP2 and the second extending part EP2, the pixel structure of the present embodiment may be used to improve the disclination region appearing near the left side of the first extending part EP1, so as to narrow the distribution range of the feather-like region.

Figure 3L:
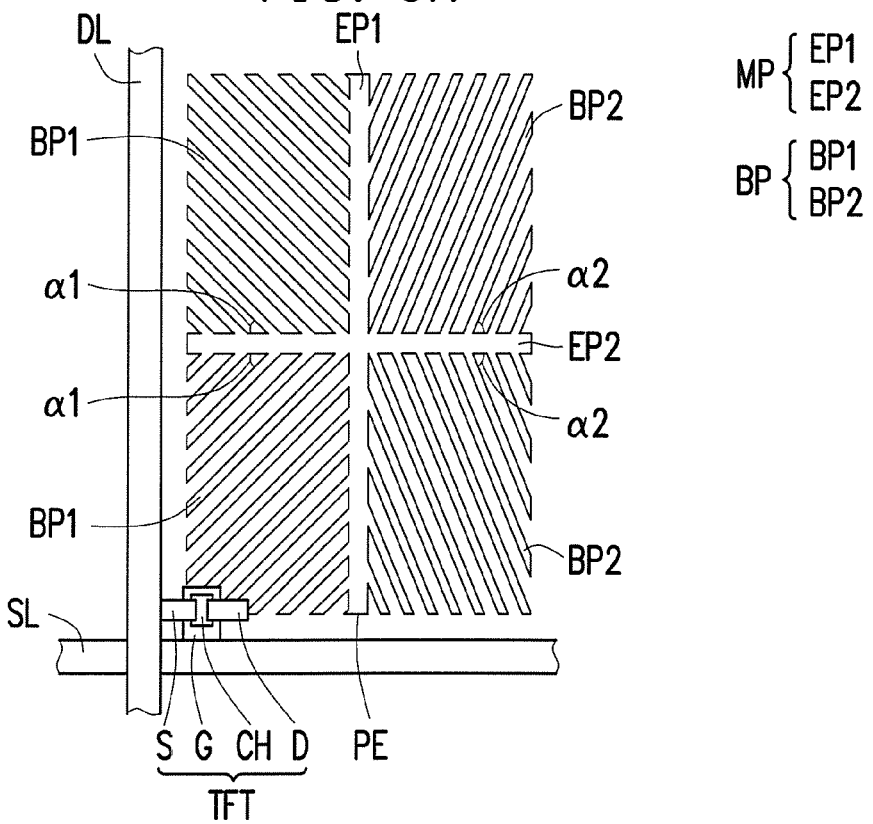

Then, referring to FIG. 3L, FIG. 3L illustrates a pixel structure similar to the pixel structure illustrated in FIG. 3I, therefore the same elements are labeled by the same reference numerals and will not be repeatedly described. The embodiments illustrated in FIG. 3L and FIG. 3I are different in the second branch portions BP2 disposed at the upper right side and the lower right side of the first extending part EP1 in FIG. 3I having the folded-line patterns, and the second branch portions BP2 disposed at the upper right side and the lower right side of the first extending part EP1 in FIG. 3L having the stripe patterns. Additionally, in FIG. 3L, the included angle α1 between each of the second branch portions BP2 disposed at the upper right side and the lower right side and the second extending part EP2 is greater than 45 degrees. In other words, in the pixel structure illustrated in FIG. 3L, since the included angle α1 (45 degrees) between each of the first branch portions BP1 and the second extending part EP2 is smaller than the included angle α2 (>45 degrees) between each of the second branch portions BP2 and the second extending part EP2, the pixel structure of the present embodiment may be used to improve the disclination region appearing near the left side of the first extending part EP1, so as to narrow the distribution range of the feather-like region.

According to the embodiments illustrated in FIG. 3A to FIG. 3L, α1 is smaller than α2 in each pixel structure, which can contribute to improving the disclination region appearing near the left side of the first extending part EP1, so as to narrow the distribution range of the feather-like region. Additionally, even though the degrees of both α1 and α2 are defined in the embodiments above, the values of α1 and α2 of the invention are not limited to the angle ranges of the embodiments above. Namely, the pixel structure achieve can achieve an effect of improving the misalignment as if α1 being smaller than α2. Moreover, it should be noted that the pixel structures illustrated in FIG. 3A to FIG. 3L may be arbitrarily selected and combined to improve the disclination region appearing near the left side of the first extending part EP1, so as to achieve the effect of the invention. For example, in an embodiment, the pattern designs of both the first branch portions BP1 and the second branch portions BP2 in the pixel structure may be modified, so as to improve the issue of alignment disorder.

In the embodiments illustrated in FIG. 3A to FIG. 3L, all the pixel structures are used to improve the disclination region appearing near the left side of the first extending part EP1. However, when the LCD panel 100 depicted in FIG. 1 is formed in a curved shape, the disclination region may also appear near the right side of the first extending part EP1 in the pixel structure. Thus, in embodiments illustrated in FIG. 4A to FIG. 4L, α1 may be greater than α2 by in the pixel electrode PE by means of the pattern designs of the first branch portions BP1 and the second branch portions BP2. Pixel structures of this type can contribute to improving the disclination region appearing near the right side of the first extending part EP1, so as to narrow the distribution range of the feather-like region.

Figure 4A:
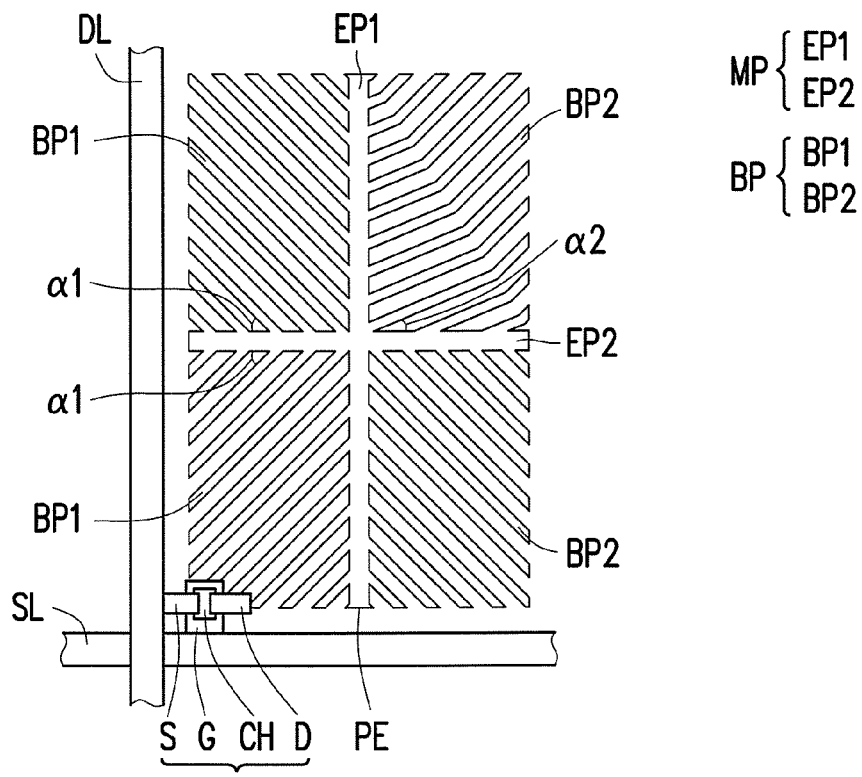
FIG. 4A to FIG. 4L are schematic diagrams illustrating examples of implementing a pixel structure according to embodiments of the invention.

FIG. 4A to FIG. 4L are schematic diagrams illustrating examples of implementing a pixel structure according to embodiments of the invention. FIG. 4A illustrates a pixel structure similar to the pixel structure illustrated in FIG. 3A, therefore the same elements are labeled by the same reference numerals and will not be repeatedly described. The embodiments illustrated in FIG. 4A and FIG. 3A are different in the second branch portions BP2 disposed at the upper right side of the first extending part EP1 in the pixel structure in FIG. 4A having the folded-line patterns, the second branch portions BP2 disposed at the lower right side having the stripe patterns, and α2 being smaller than 45 degrees. Additionally, the first branch portions BP1 include a plurality of stripe patterns extending obliquely and parallel to one another, and α1 is 45 degrees. In other words, in the pixel structure illustrated in FIG. 4A, since the included angle α1 (45 degrees) between each of the first branch portions BP1 and the second extending part EP2 is greater than the included angle α2 (<45 degrees) between each of the part of the second branch portions BP2 and the second extending part EP2, the pixel structure of the present embodiment may be used to improve the disclination region appearing near the right side of the first extending part EP1. In brief, the pixel electrode illustrated in FIG. 4A and the pixel electrode illustrated in FIG. 3A are merely mirror structures in contrast to each other and are respectively used to improve the feather-like disclination region appearing at the left side or the right side of the first extending part EP1.

Figure 4B:
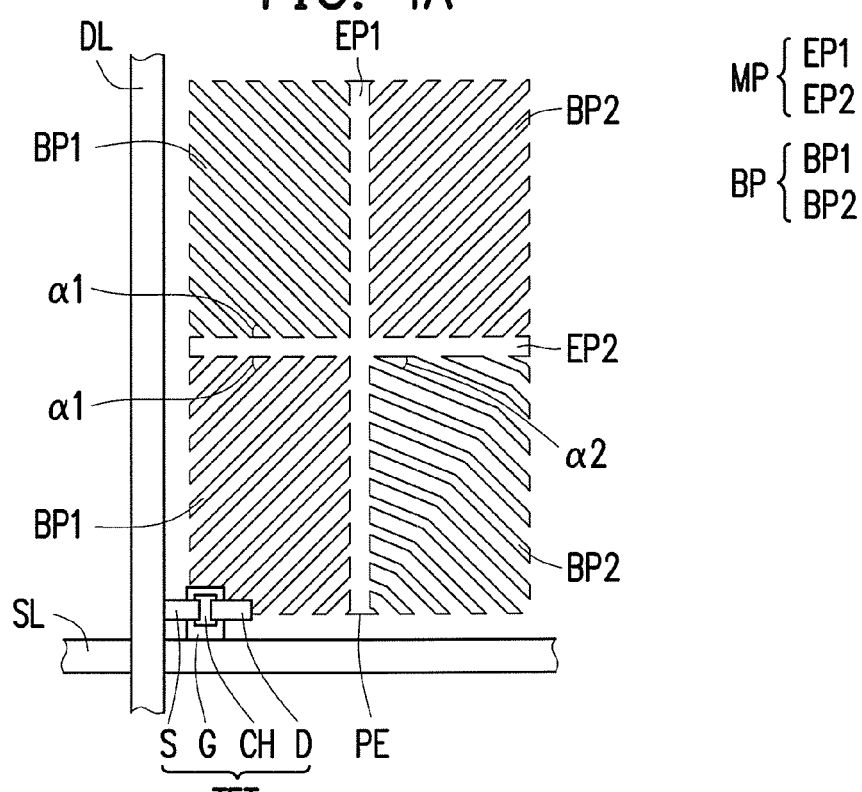
Figure 4C:
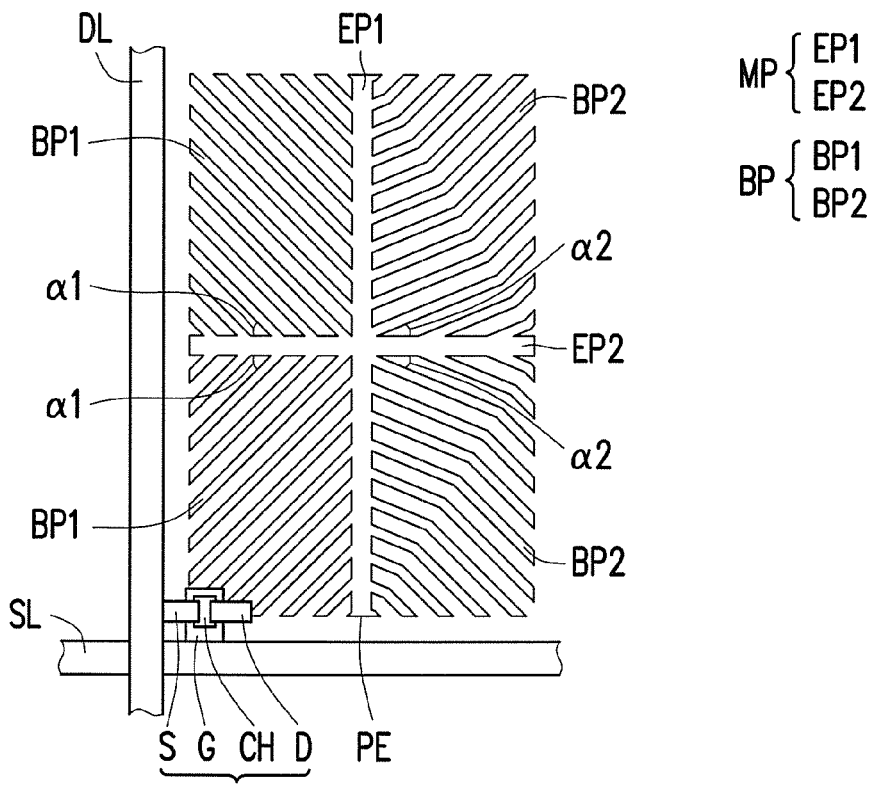
Figure 4D:
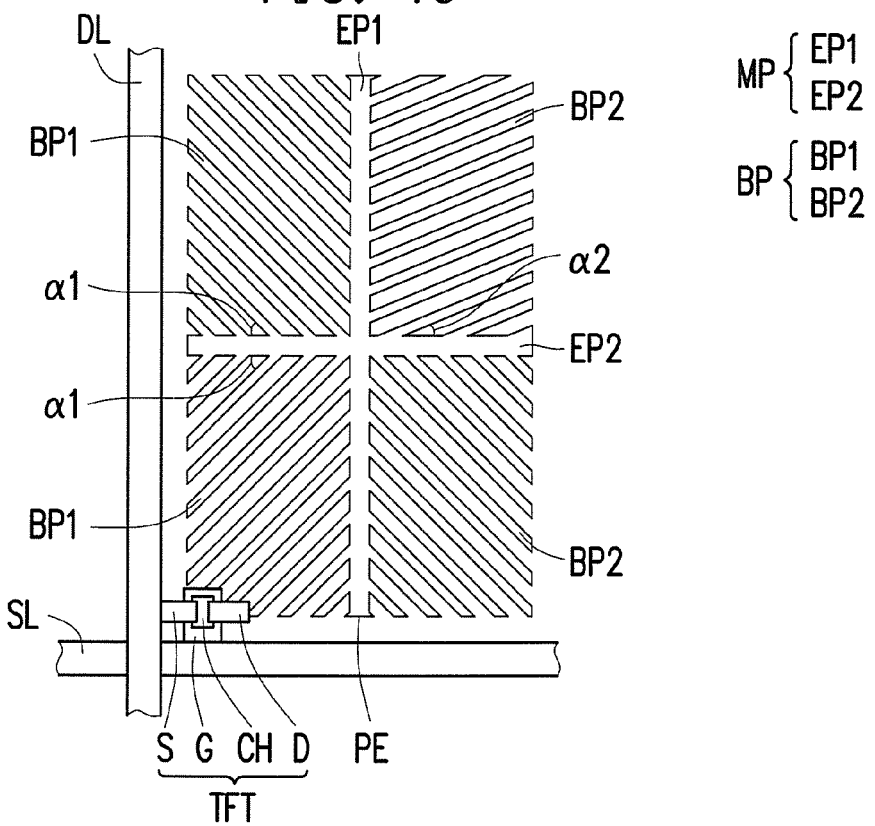
Figure 4E:
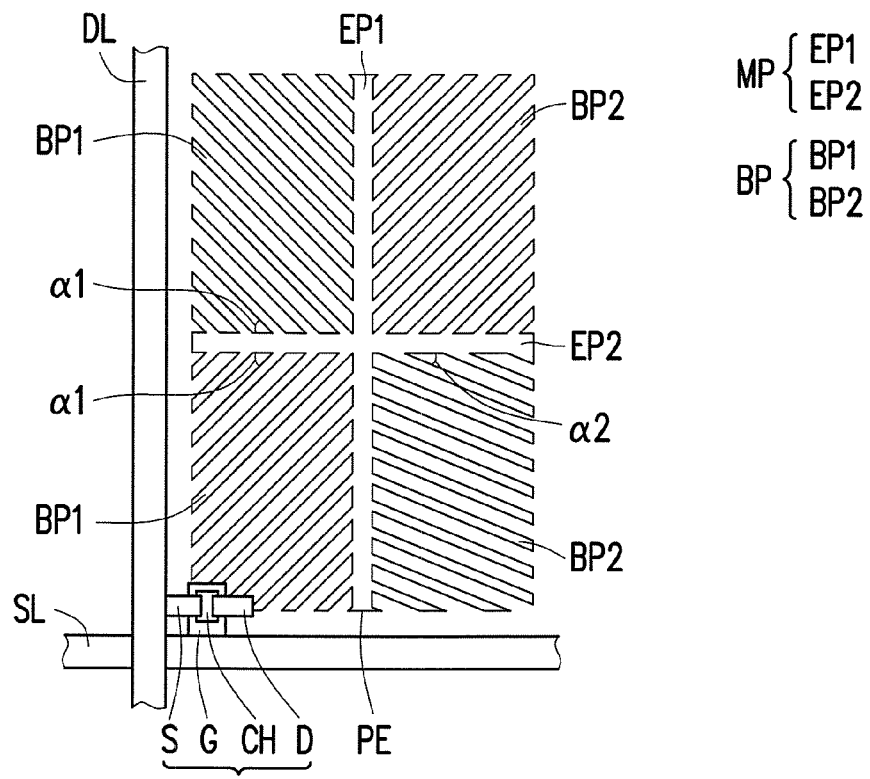
Figure 4F:
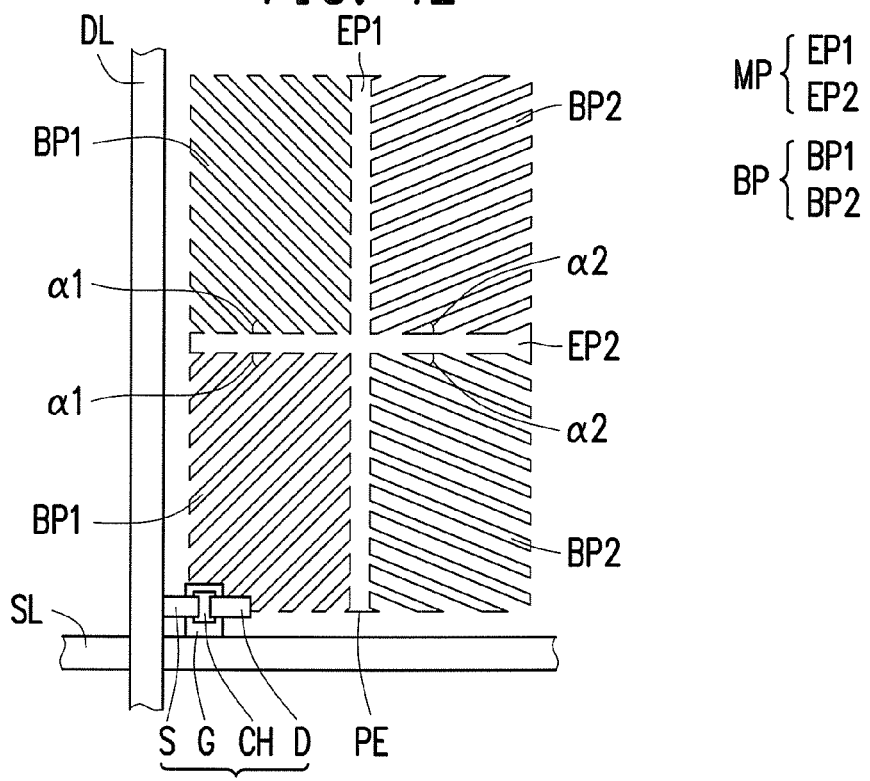
Figure 4G:
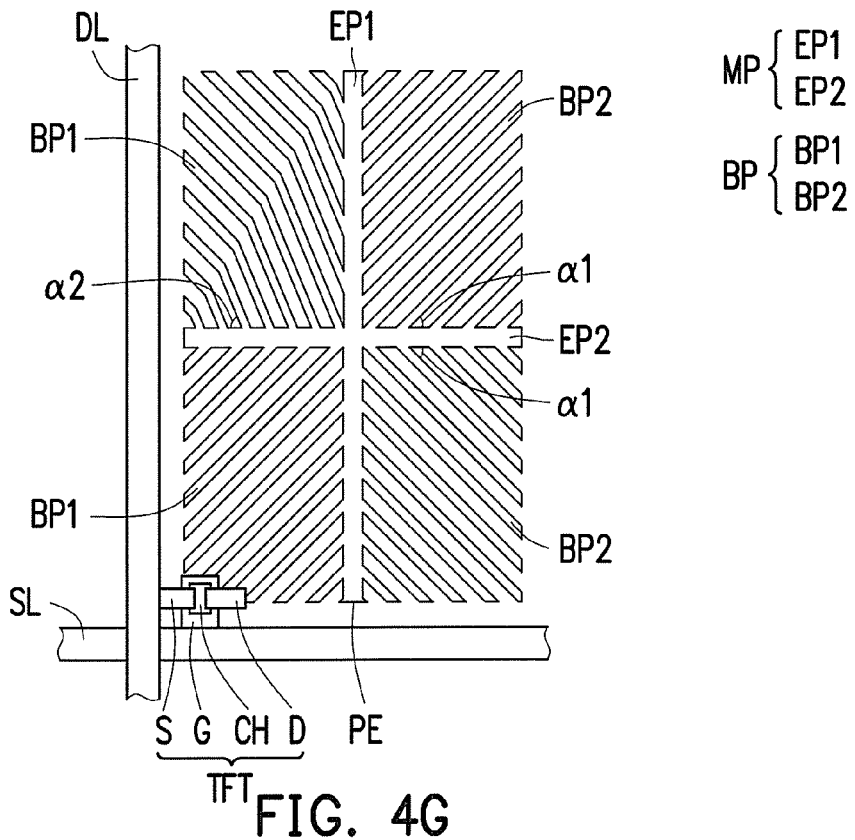
Figure 4H:
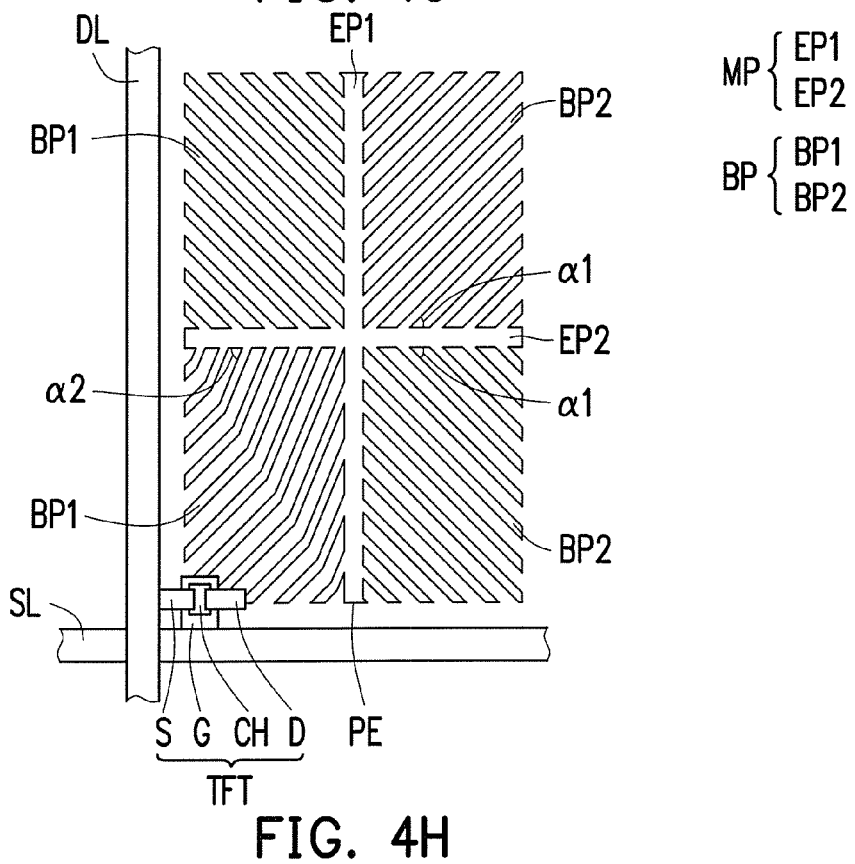
Figure 4I:
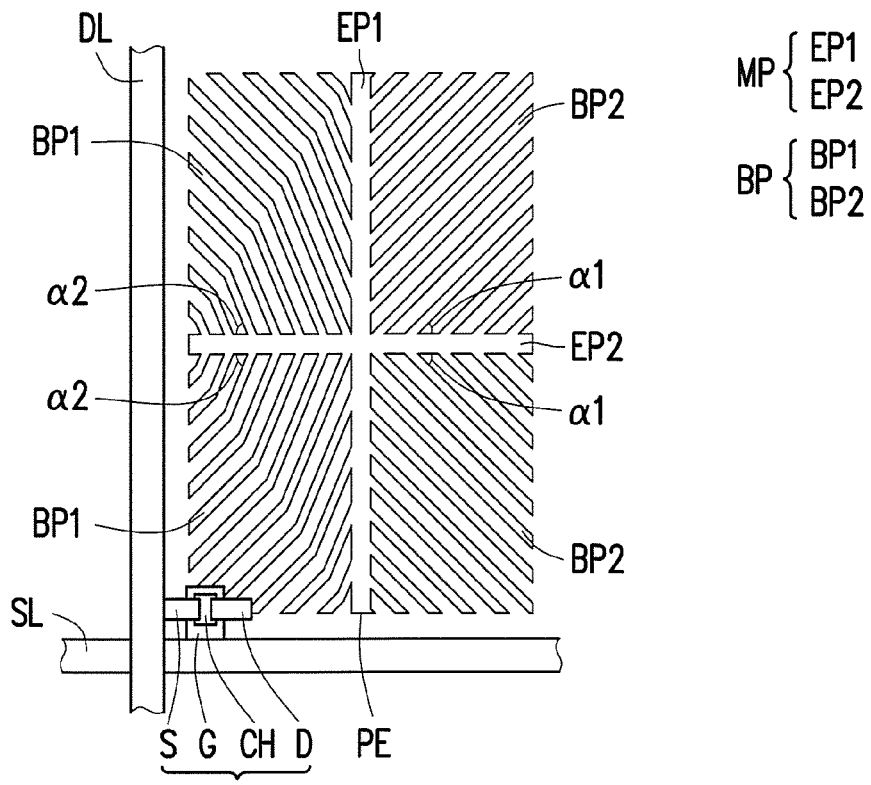
Figure 4J:
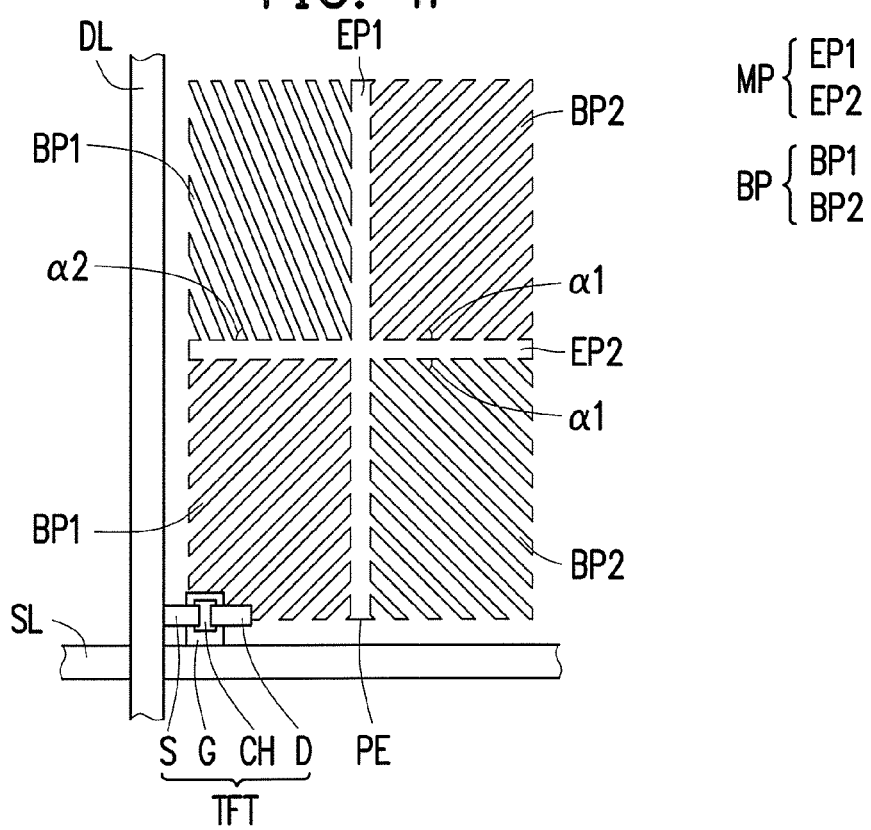
Figure 4K:
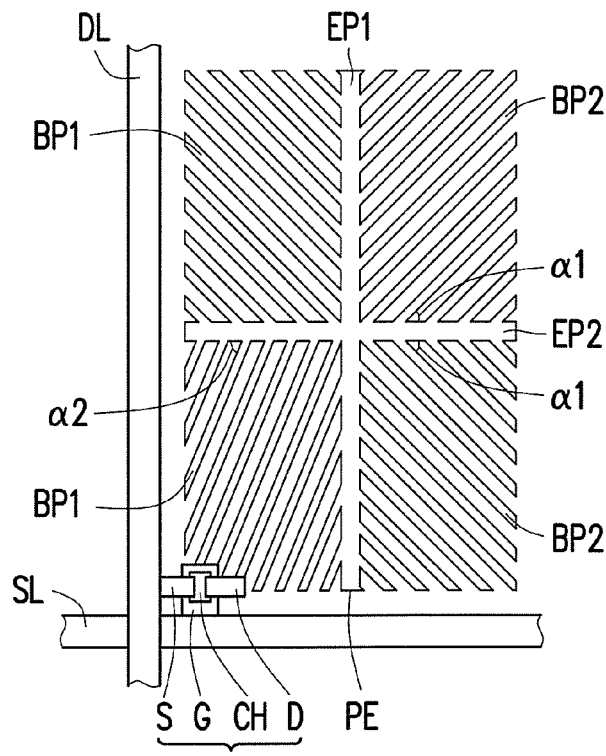
Figure 4L:
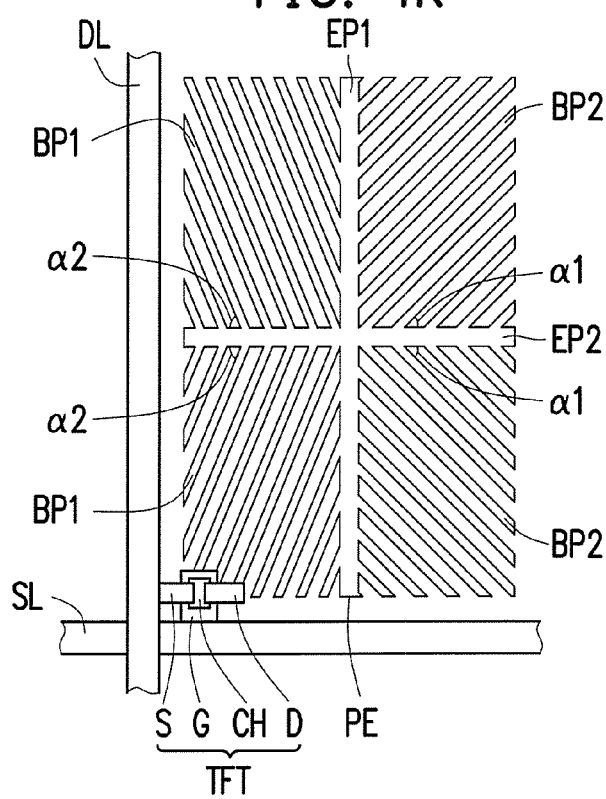

As described above, pixel electrodes illustrated in FIG. 4B to FIG. 4L and the pixel electrodes illustrated in FIG. 3B to FIG. 3L are corresponding to each other and are merely mirror structures in contrast to each other, which will not be repeatedly described. For example, in the present embodiment, the folded-line patterns of the second branch portions BP2 having the included angle α2 smaller than 45 degrees may be disposed at the upper right side (as illustrated in FIG. 4A), the lower right side (as illustrated in FIG. 4B) and the upper and the lower right sides (as illustrated in FIG. 4C) of the first extending part EP1; or alternatively, the stripe patterns of the second branch portions BP2 having the included angle α2 smaller than 45 degrees may be disposed at the upper right side (as illustrated in FIG. 4D), the lower right side (as illustrated in FIG. 4E) and the upper and the lower right sides (as illustrated in FIG. 4F) of the first extending part EP1. Additionally, the folded-line patterns of the first branch portions BP1 having the included angle α1 greater than the 45 degrees may be disposed at the upper left side (as illustrated in FIG. 4G), the lower left side (as illustrated in FIG. 4H) and the upper and the lower left sides (as illustrated in FIG. 4I) of the first extending part EP1, or alternatively, the stripe patterns of the first branch portions BP1 having the included angle α1 greater than 45 degrees may be disposed at the upper left side (as illustrated in FIG. 4J), the lower left side (as illustrated in FIG. 4K) and the upper and the lower left sides (as illustrated in FIG. 4L) of the first extending part EP1. In other words, in the pixel structure illustrated in FIG. 4A to FIG. 4L, since the included angle α1 between each of the first branch portions BP1 and the second extending part EP2 is greater than the included angle α2 between each of part of the second branch portions BP2 and the second extending part EP2, the pixel structure of the present embodiment may be used to improve the disclination region appearing near the right side of the first extending part EP1, so as to narrow the distribution range of the feather-like region. Moreover, it should be noted that the pixel structures illustrated in FIG. 3A to FIG. 3L may be arbitrarily selected and combined to improve the disclination region appearing near the right side of the first extending part EP1, so as to achieve the effect of the invention.

Figure 5A:
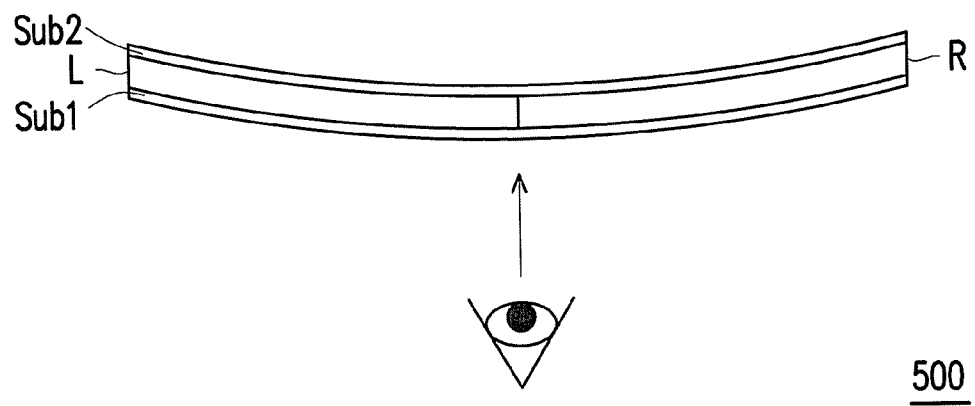
FIG. 5A is a schematic diagram illustrating a curved display curved display according to another embodiment of the invention.
Figure 5B:
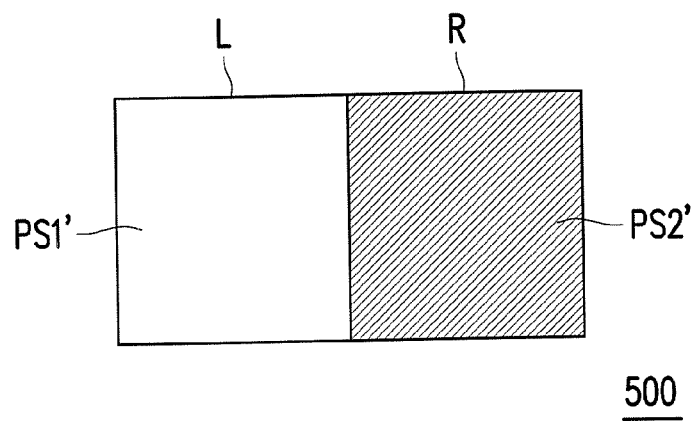
FIG. 5B is a front view of the curved display depicted in FIG. 5A in a viewing angle direction.

FIG. 5A is a schematic diagram illustrating a curved display curved display according to another embodiment of the invention, and FIG. 5B is a front view of the curved display depicted in FIG. 5A in a viewing angle direction. Referring to FIG. 5A and FIG. 5B together, in the present embodiment, a curved display 500 includes a first curved substrate Sub1, a plurality of first pixel structures PS1', a plurality of second pixel structures PS2' ab a second curved substrate Sub2. The first pixel structures PS1' are disposed on a left region L of the first curved substrate Sub1, and each of the first pixel structures PS1' is in an arbitrary combination selected from the pixel structures of the embodiments illustrated in FIG. 4A to FIG. 4L, so as to achieve α1 being greater than α2 in each pixel structure. The second pixel structures PS2' are disposed on a right region R of the first curved substrate Sub2, and each of the second pixel structures PS2' in an arbitrary combination selected from the pixel structures of the embodiments illustrated in FIG. 3A to FIG. 3L, so as to achieve α1 being smaller than α2 in each pixel structure.

Additionally, the second curved substrate Sub2 is directly bonded to the first curved substrate Sub1 to cover each of the first pixel structures PS1' and each of the second pixel structures PS2'. Specially, an outer surface of the first curved substrate Sub1 is a concave curved surface, and an outer surface of the second curved substrate Sub2 is a concave curved surface in a viewing angle of a viewer.

In the present embodiment, since the outer surface of the first curved substrate Sub1 is the concave curved surface, and the outer surface of the second curved substrate Sub2 is the convex curved surface, the curved display 500 is curved in a direction right in contrast to the curved direction of the curved display 200 illustrated in FIG. 2A. In other words, in the curved display 500, the disclination region occurred by each pixel structure is also right in contrast to the disclination region occurred by the curved display 200. Namely, each of the pixel structure (in which α1 is greater than α2) illustrated in FIG. 4A to FIG. 4L serves as the first pixel structure PS'1 and is disposed on the left region L of the curved display to improve the issue of alignment disorder. Moreover, each of the pixel structures (in which α1 is smaller than α2) illustrated in FIG. 3A to FIG. 3L serves as the second pixel structure PS2' and is disposed on the right region R of the curved display. Thus, the pixel structures disposed in the curved display 500 may be used to improve the disclination regions appearing near the left and the right sides of the first extending part EP1, so as to narrow the distribution range of the feather-like region.

Figure 6:
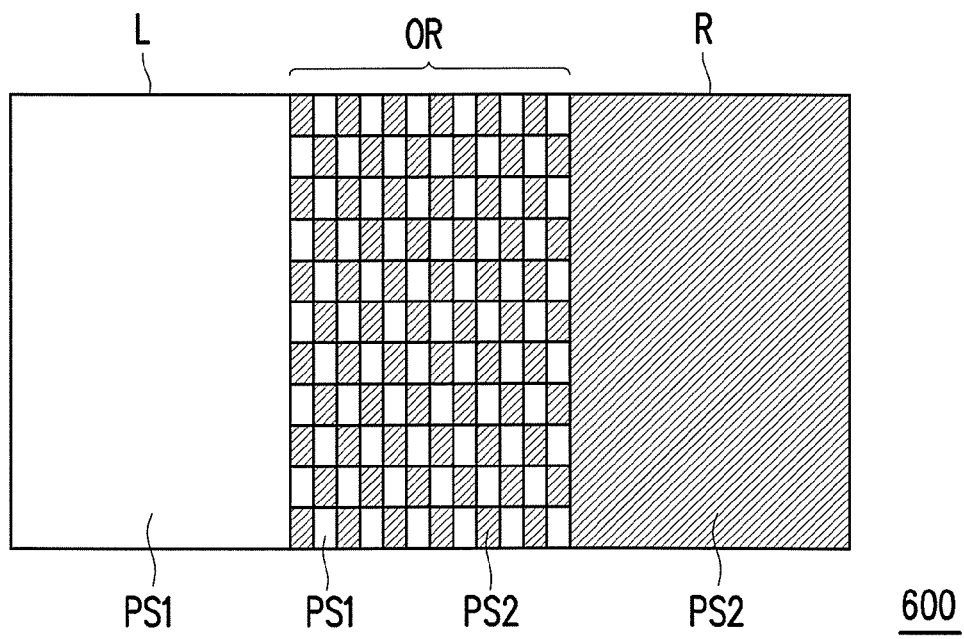
FIG. 6 is a front view of a curved display curved display according to another embodiment of the invention.

FIG. 6 is a front view of a curved display curved display according to another embodiment of the invention. FIG. 6 illustrates a curved display 600 that may be selected from the curved display 200 of FIG. 2A or the curved display 500 of FIG. 5A. The embodiment of FIG. 6 is similar to the embodiments of FIGS. 2A and 5A and only different therefrom in the curved display illustrated in FIG. 2A or 5A being directly separated into the left region L and the right region R to achieve the plurality of first pixel structures PS1 and the plurality of second pixel structures PS2 being respectively disposed on the left region L and the right region R. By contrary, in the curved display 600 illustrated in FIG. 6, an overlapping region OR is between the left region L and the right region R. The first pixel structures PS1 are disposed on the left region L, the second pixel structures PS2 are disposed on the right region R, and in addition, part of the first pixel structures PS1 and part of the second pixel structures PS2 are alternately arranged in a mosaic manner on the overlapping region OR. In other words, the part of the first pixel structures PS1 and the part of the second pixel structures PS2 are evenly distributed in the overlapping region OR, such that densities of the first pixel structures PS1 and the second pixel structures PS2 are the same in the overlapping region OR. The first pixel structures PS1 and the second pixel structures PS2 may be in an arbitrary combination selected from the pixel structures of the embodiments illustrated in FIG. 3A to FIG. 3L or in an arbitrary combination selected from the pixel structures of the embodiments illustrated in FIG. 4A to FIG. 4L according to variations of the concave and convex structures of the curved display. Thus, the pixel structures disposed in the curved display 600 may be used to improve the feather-like disclination regions appearing near the left and the right sides of the first extending part EP1, so as to narrow the distribution range of the feather-like region and achieve a good display effect.

Figure 7:
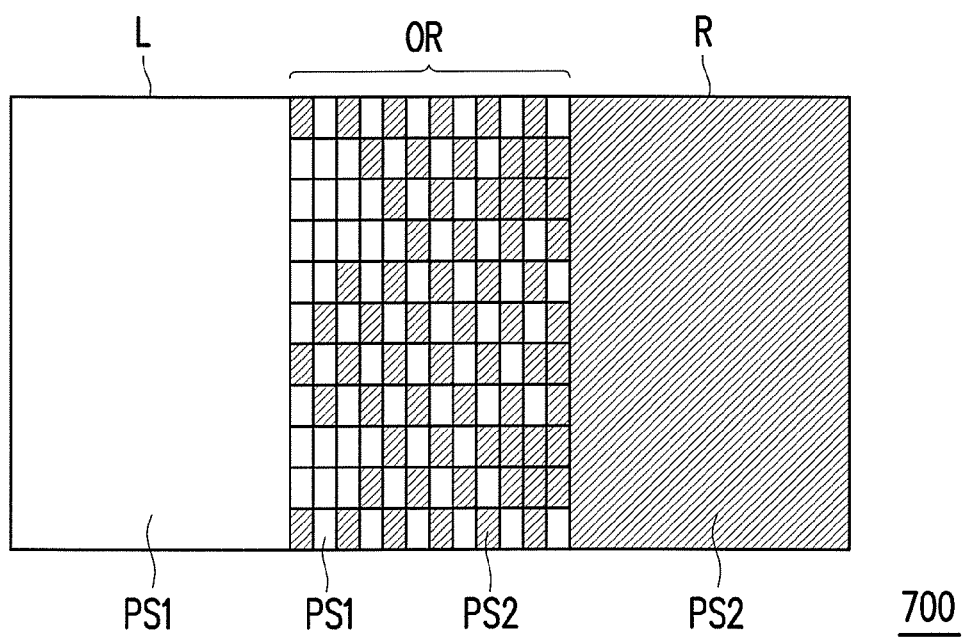
FIG. 7 is a front view of a curved display according to another embodiment of the invention.

FIG. 7 is a front view of a curved display according to another embodiment of the invention. FIG. 7 illustrates a curved display 700 similar to the curved display 600 illustrated on FIG. 6, therefore the same elements are labeled by the same reference numerals and will not be repeatedly described. The embodiments illustrated in FIG. 7 and FIG. 6 are different in the first pixel structures PS1 and the second pixel structures PS2 illustrated in FIG. 7 are disposed are incrementally disposed in the overlapping region OR. Namely, the first pixel structures PS1 are disposed and distributed incrementally from the left region L toward the overlapping region OR, and the second pixel structures PS2 are disposed and distributed incrementally from the right region R toward the overlapping region OR. As described above, in the overlapping region OR, pixel arrangement near the left region L leads the first pixel structures PS1 to be disposed in a higher density, and pixel arrangement near the right region R leads the second pixel structures PS2 to be disposed in a higher density. To be more specific, the part of the first pixel structures PS1 and the part of the second pixel structures PS2 are disposed in a manner from the part of the first pixel structures PS1 having the highest density gradually changed to the second pixel structures PS2 having the highest density according to an order from left to right or an order from the right to the left, to in the overlapping region OR. Likewise, the pixel structures disposed in the curved display 700 illustrated in FIG. 7 may be used to improve the disclination regions appearing near the left and the right sides of the first extending part EP1, so as to narrow the distribution range of the feather-like region and achieve a good display effect.

To summarize, in the pixel structure provided by the invention, the plurality of first branch portions and the plurality of second branch portions have different included angles and pattern designs. Thereby, the disclination regions appear near the left and the right sides of the first extending part in the pixel structure can be improved to narrow the distribution range of the feather-like region. In other words, the pixel structure of the invention is applicable to the curved display and can contribute to improve the issue of alignment disorder. Moreover, the pixel structure of the invention can further contribute to improve the issues of poor brightness uniformity and the deterioration of the liquid crystal response time occurring in the conventional curved display panel.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A curved display, comprising:
   a first curved substrate;
   a plurality of pixel structures, each of the pixel structures comprising:
      an active device;
      a pixel electrode, electrically connected with the active device, the pixel electrode comprising:
         a main trunk portion, comprising a first extending part and a second extending part crossing over each other; and
         a plurality of branch portions, connected with the main trunk portion, wherein each of the branch portions is separated by the main trunk portion, the branch portions comprises a plurality of first branch portions and a plurality of second branch portions, the first extending part separates the first branch portions from the second branch portions, wherein an included angle between each of the at least part of the first branch portions and the second extending part is $\alpha 1$, and an included angle between each of the at least part of the second branch portions and the second extending part is $\alpha 2$,
   wherein the pixel structures comprise a plurality of first pixel structures disposed on a left region of the first curved substrate and a plurality of second pixel structures disposed on a right region of the first curved substrate, in each of the first pixel structures, the first branch portions are located at the left side of the first extending part, and the second branch portions are located at the right side of the first extending part, and $\alpha 1$ is smaller than $\alpha 2$, and in each of the second pixel structures, the first branch portions are located at the left side of the first extending part, and the second branch portions are located at the right side of the first extending part, and $\alpha 1$ is greater than $\alpha 2$; and
   a second curved substrate, bounded to the first curved substrate to cover the first pixel structures and the second pixel structures, wherein an outer surface of the first curved substrate is a convex curved surface, an outer surface of the second curved substrate is a concave curved surface, first extending parts in the first pixel structures are parallel to an uncurved edge of the first curved substrate, and first extending parts in the second pixel structures are parallel to an uncurved edge of the second curved substrate.

2. The curved display according to claim 1, further comprising:
   an overlapping region, located between the left region and the right region, wherein part of the first pixel structures and part of the second pixel structures are alternately arranged in a mosaic manner in the overlapping region.

3. The curved display according to claim 1, further comprising:
   an overlapping region, located between the left region and the right region, wherein part of the first pixel structures and part of the second pixel structures are disposed in a manner from the part of the first pixel structures having the highest arrangement density gradually changed to the part of the second pixel structures having the highest arrangement density according to an order from left to right or an order from right to left in the overlapping region.

4. The pixel structure according to claim 1, wherein the included angle ($\alpha 1$) between one of the first branch portions and the second extending part of one of the first pixel structures is smaller than 45 degrees and the included angle ($\alpha 2$) between one of the second branch portions and the second extending part of one of the first pixel structures is greater than 45 degrees, and wherein the included angle ($\alpha 1$) between one of the first branch portions and the second extending part of one of the second pixel structures is greater than 45 degrees and the included angle ($\alpha 2$) between one of the second branch portions and the second extending part of one of the second pixel structures is smaller than 45 degrees.

5. A curved display, comprising:
   a first curved substrate;
   a plurality of pixel structures, each of the pixel structures comprising:
      an active device;
      a pixel electrode, electrically connected with the active device, the pixel electrode comprising:
         a main trunk portion, comprising a first extending part and a second extending part crossing over each other; and
         a plurality of branch portions, connected with the main trunk portion, wherein each of the branch portions is separated by the main trunk portion, the branch portions comprises a plurality of first branch portions and a plurality of second branch portions, the first extending part separates the first branch portions from the second branch portions, wherein an included angle between each of at least part of the first branch portions and the second extending part is $\alpha 1$, and an included angle between each of at least part of the second branch portions and the second extending part is $\alpha 2$, and at least one of the first branch portions and the second branch portions has a folded-line pattern,
   wherein the pixel structures comprise a plurality of first pixel structures disposed on a left region of the first curved substrate and a plurality of second pixel structures, disposed on a right region of the first curved substrate, in each of the first pixel structures, the first branch portions are located at the left side of the first extending part, and the second branch portions are located at the right side of the first extending part, and $\alpha 1$ is greater than $\alpha 2$, and in each of the second pixel structures, the first branch portions are located at the left side of the first extending part, and the second branch portions are located at the right side of the first extending part, and α1 is smaller than α2; and a second curved substrate, bounded to the first curved substrate to cover the first pixel structures and the second pixel structures, wherein an outer surface of the first curved substrate is a concave curved surface, an outer surface of the second curved substrate is a convex curved surface.

6. The curved display according to claim 5, further comprising:

an overlapping region, located between the left region and the right region, wherein part of the first pixel structures and part of the second pixel structures are alternately arranged in a mosaic manner in the overlapping region.

7. The curved display according to claim 5, further comprising:

an overlapping region, located between the left region and the right region, wherein part of the first pixel structures and part of the second pixel structures are disposed in a manner from the part of the first pixel structures having the highest arrangement density gradually changed to the part of the second pixel structures having the highest arrangement density according to an order from left to right or an order from right to left in the overlapping region.

8. The pixel structure according to claim 5, wherein the included angle (α1) between one of the first branch portions and the second extending part of one of the first pixel structures is greater than 45 degrees and the included angle (α2) between one of the second branch portions and the second extending part of one of the first pixel structures is smaller than 45 degrees, and wherein the included angle (α1) between one of the first branch portions and the second extending part of one of the second pixel structures is smaller than 45 degrees and the included angle (α2) between one of the second branch portions and the second extending part of one of the second pixel structures is greater than 45 degrees.

* * * * *

UNITED STATES PATENT AND TRADEMARK OFFICE
CERTIFICATE OF CORRECTION

PATENT NO. : 9,785,019 B2
APPLICATION NO. : 14/951507
DATED : October 10, 2017
INVENTOR(S) : Hung-Che Lin et al.

It is certified that error appears in the above-identified patent and that said Letters Patent is hereby corrected as shown below:

On the Title Page

At Item (54) and in the Specification at Column 1 Line 1, should read as:
PIXEL STRUCTURE AND CURVED DISPLAY Signed and Sealed this
Thirteenth Day of February, 2018

Andrei Iancu
*Director of the United States Patent and Trademark Office*